United States Patent [19]

Lerner

[11] 3,831,173

[45] Aug. 20, 1974

[54] GROUND RADAR SYSTEM

[75] Inventor: Robert M. Lerner, Arlington, Mass.

[73] Assignee: Massachusetts Institute of Technology, Cambridge, Mass.

[22] Filed: Dec. 17, 1969

[21] Appl. No.: 885,877

[52] U.S. Cl. .................................. 343/5 R, 324/5
[51] Int. Cl. ............................................. G01s 9/02
[58] Field of Search ..................... 343/5 R; 324/5, 6

[56] References Cited
UNITED STATES PATENTS

| 2,585,907 | 2/1952 | Barret | 343/5 R X |
| 3,351,936 | 11/1967 | Feder | 343/5 R |
| 3,392,384 | 7/1968 | Wesch | 343/5 R |
| 3,449,657 | 6/1969 | Fredriksson et al. | 324/6 |

Primary Examiner—T. H. Tubbesing
Attorney, Agent, or Firm—Arthur A. Smith, Jr.; Martin M. Santa; Robert T. Dunn

[57] ABSTRACT

A system for locating underground objects, such as pipes, utility lines, culverts, ledges, and like kinds of underground discontinuities, including voids to depths in excess of 10 feet, includes a basic radar having a special antenna design which launches radiation that penetrates the earth and receives reflections from underground discontinuities for recordation in a moving vehicle.

8 Claims, 8 Drawing Figures

Fig. 1

ALL DIMENSIONS IN INCHES

FACTORS AFFECTING RADAR PERFORMANCE

Fig. 4

ATTENUATION AND DELAY NEAR TURNOVER ω*

Fig. 5

LOSSES IN DAMP SOIL MATERIALS

Fig. 6

PATENTED AUG 20 1974                                   3,831,173

INVENTOR.
ROBERT M. LERNER
BY
ATTORNEY

GROUND RADAR SYSTEM

Many attempts have been made in the past to utilize radar or similar devices to determine the location of underground objects. However, these devices have commonly met failure. One of the basic problems has been in considering radar principles. The problems associated with radar are normally directed to far field effects in their antenna designs. In contradistinction to those areas the present invention is directed to a radar whose antenna exploits the near field effects and not only neglects but excludes far field effects as clutter.

Another problem which resulted in the failure of prior attempts at producing a radar for the examination of underground discontinuities was in the balance of the signal within the system. In ordinary radar, a signal is produced and is transmitted through an antenna, it strikes a target, returns to the antenna, is received and displayed. With the present invention, the received signals are much weaker and the target is in much closer proximity to the antenna than those of ordinary radar. Accordingly, it has been discovered that ring down (the time that the signal decays after transmission within the antenna) must be considerably faster than ring down in the ordinary antenna. If the transmitter causes or permits a signal to linger within the circuit it will obscure the very weak returns that comes back to the receiver from discontinuities that caused the energy to be reflected. Accordingly, the time to ring down relationship is extremely critical.

In an ordinary radar, the antenna has a reflector and an active element which causes the energy to be radiated from the antenna to distant objects. In the present case, the antenna is made of small sections of transmission lines which are so designed that the reflections within the antenna are minimized such that a transmitter signal energizes the active elements causing a burst of energy to be coupled to the ground whose plane is in such close proximity to the antenna that it is effectively coupled directly to the near field produced by the antenna. These active elements are so selected that the signal after transmission attenuates within the system within a few nanoseconds. The return signals, which are extremely weak, are then returned to the antenna and received a few nanoseconds later, and are readily distinguished if they have been reflected from discontinuities at preselected depths.

The earth has a variety of potential soils, each soil has its own attenuation features; accordingly, a single frequency may be desirable in one type of soil and entirely undesirable in another. In the present invention a transient signal is transmitted which contains a burst of preselected frequencies compatible to a wide range of useful signals. It has been discovered that this transient produces effective reflections from a wide variety of underground objects.

It has also been found that ordinary displays are not suitable, because the structure in the present invention is intended to be mobile over the ground. Accordingly, the reflections must be keyed to the position of the antenna with reference to the earth at various points. Accordingly, a sonar-type recorder is used to record reflections and the various signatures representing different objects are then recognized, pinpointing their location accurately.

The present invention, therefore, is particularly useful in the construction industry where the location of underground pipes and other objects and discontinuities can be quite troublesome if they are not discovered before construction has commenced. Accordingly, the specific locations for foundations or the type of foundation necessary for a specific location can be designed well in advance. Furthermore, utilities and other service organizations can confirm the location very accurately of underground pipes which are in need of repair where the bench marks or reference points have been altered since they were originally installed or where the blueprints may be in error. Such a device can be keyed in with nominal borings to define the underground structure in precise detail. The location of borings are correlated with the return signals of the ground radar device in the course of the investigation such that a complete picture of the underground structure could be obtained.

Therefore, an object of the present invention is to provide a radar for use in determining the location and character of underground discontinuities.

Another object of the present invention is to provide an underground radar device which is useful in determining underground reflections over a wide range of underground soil conditions.

Another object of the present invention is to provide a radar antenna for use in underground radar which has a ring down substantially faster than the return signal from close objects.

Another object of the present invention is to provide a radar antenna which has a strong near field and very weak far field characteristics.

Other objects, features, and advantages of the present invention will be better understood in view of the following specification of an embodiment of the invention represented by the attached drawings of which:

Figure 1:
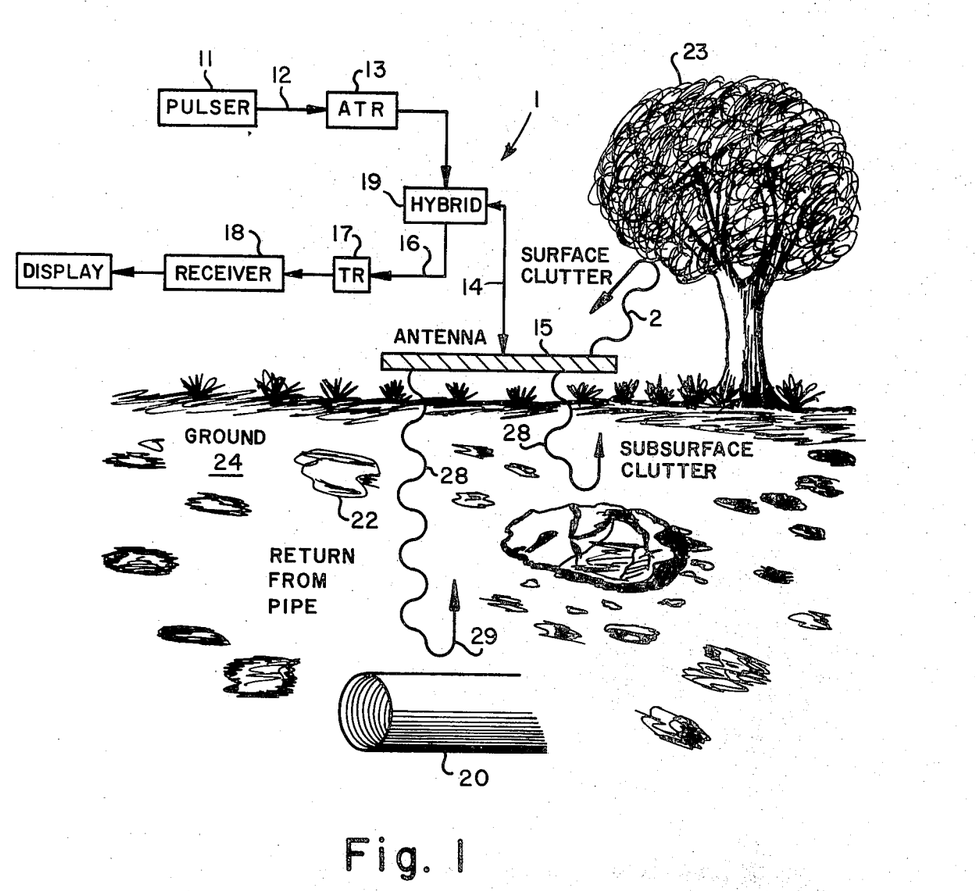
FIG. 1 is a block diagram illustrating the operational principles of the present invention.

Referring to FIG. 1, we see the basic operational elements of the present invention. The radar system 1 is designed to send pulses into ground 24. At the same time, however, some energy 2 is radiated out to trees and other terrain objects 23. However, the device is so designed that coupling in air is virtually obviated. The basic reason for this is that the antenna 15 of the system is designed to radiate virtually within the ground plane. Pulse generator (Pulser) 11 sends a pulse of energy down transmitter line 12 to the automatic transmit-receive switch (ATR) 13. This pulse is passed by the switch and arrives at the hybrid junction 19 which conducts this to the transmission line 14 which feeds antenna 15. The energy is radiated from the antenna 15 as radiation 28 and is reflected from a substantial underground object such as pipe 20 back to the antenna, as radiation 29. At antenna 15 the energy is then gathered and sent down transmission line 14 to hybrid junction 19, thence by transmission line 16 through transmit-receive switch (TR) 17 to receiver 18. There are some reflections from underground objects such as small rocks 22, however, this is only clutter and is readily distinguishable from the most significant underground objects like pipe 20. Tree 23 also reflects some energy back to the antenna, however, this energy is also readily distinguishable as clutter.

The pulse generator 11 and receiver 18 are nonreflective and are well known in the prior art and will not be discussed in detail. However, the pulse generated must produce certain prescribed energy pulses. Studies of the conductivity of typical ground have indicated that 100 megahertz produces overall the best reflections from the deepest range. It was further discovered that the earth's attenuation or conductivity varies widely and so, signals with frequencies covering the range between 30 and 150 megahertz are required. In the present invention these discoveries are implemented in conjunction with the properly designed antenna by a transient pulse generator as the pulser 11. A Transient pulse contains a wide range of frequencies and the antenna is designed to select only those frequencies which are desirable for radiating to the earth. It was determined by experimental tests and analyses that a 3 to 10 nanosecond pulse, was the most optimum duration to meet the peculiar requirements and objects of the invention set forth herein.

Figure 2:
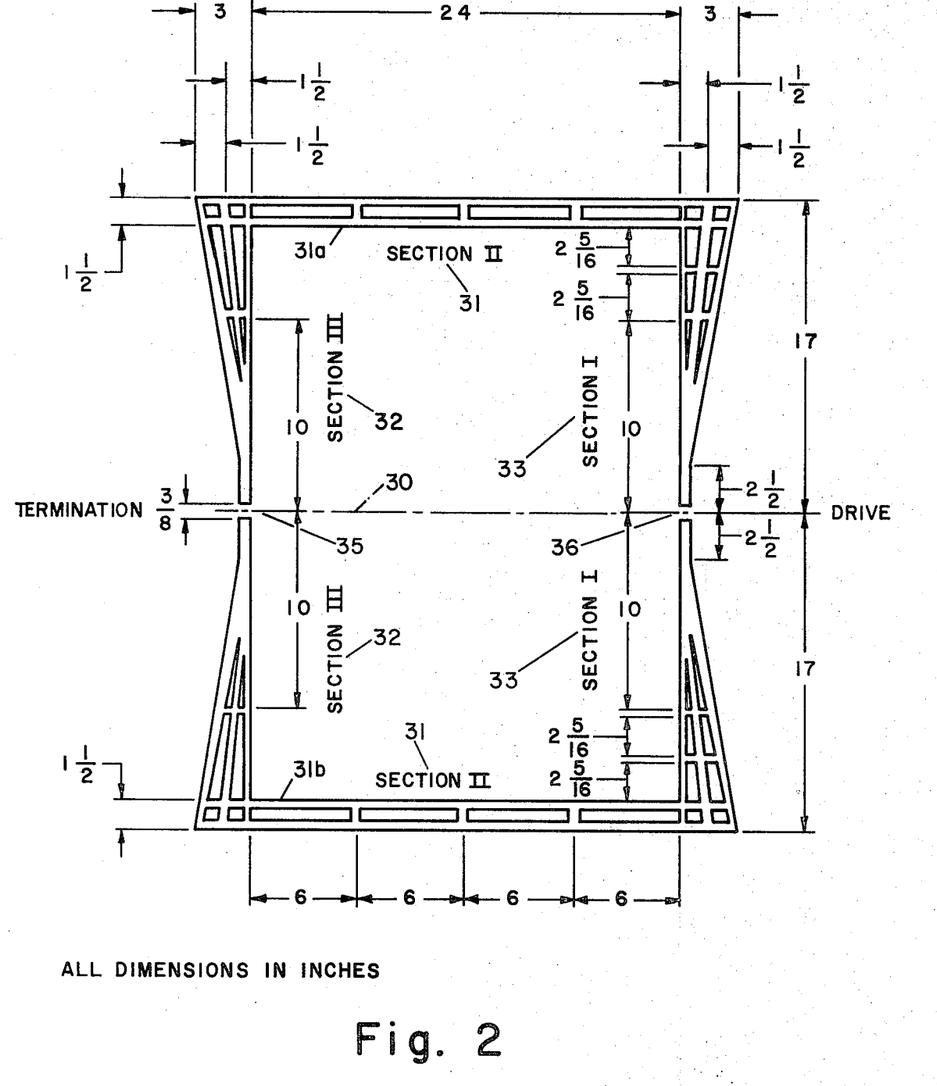
FIG. 2 is a detailed cross-section of the antenna.

As stated above, the antenna 15 is an important element in achieving the results obtained in the present invention. FIG. 2 shows such an antenna constructed transmission line segments. It is made up of three sections each symmetrical with respect to line 30. A signal from transmission line 14 is applied at drive 36, passes through the symmetrical sections 33 which define a two element tapered conductor, then continues through the parallel symmetrical sections 31, thence to the tapered symmetrical sections 32, until it arrives at the termination 35. A basic requirement of this antenna structure be that the antenna be made up of at least one finite section of two element transmission line such as 31, with the center frequency at 100 megahertz and that the antenna is laid flat and close to the surface of the earth and at no time is it more than a few inches above the earth. Thus, the energy that is transmitted (radiated) by the sections of transmission line resonates between the antenna and reflectors in earth and is coupled most efficiently to the earth at these frequencies. In operation, the antenna is laid out in a sled slightly larger than the dimensions of the antenna, as shown. The sled is dragged over the earth and transient reflected signals received by the antenna are recorded. By having the antenna designed flat and in the earth's plane, the clutter or energy reflected from objects such as trees or other vehicles above the ground are virtually eliminated in terms of their affecting or masking reflected signals from underground objects.

Many variations can be made in this antenna, however, the one key common feature that stands out is that the various sections 31, 32 and 33 are segments of two element transmission lines and, further, they are preferably laid out so that they will be in the earth's plane when they are radiating. It is essential that the section 31 of two parallel elements 31a and 31b, symmetrical with respect to the centerline 30, be finite in length. More particularly, the spacing of these elements and the length of the section must be of the same order of magnitude. Furthermore, these dimensions are preferably the same order of magnitude as a quarter wavelength of the center frequency. The theoretical characteristic impedance of these transmission lines in this embodiment is 450 ohms. A balanced termination 35 will prevent reflections in the transmission lines and will maximize ring down, which is a critical element discussed below.

Figure 3:
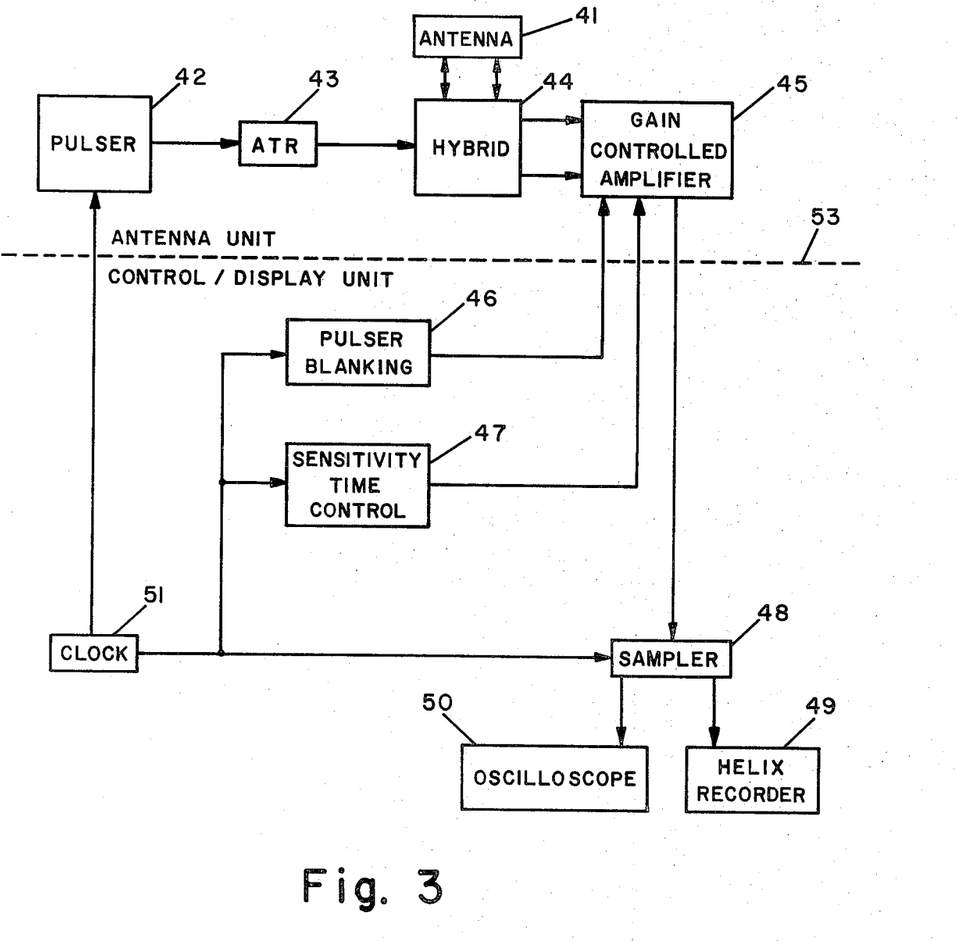
FIG. 3 is a block diagram illustrating the required elements of the present invention.

Referring to FIG. 3, there is shown a block diagram which reveals more details than shown in FIG. 1. Those items above the line 53 in FIG. 3 are carried on the antenna sled pulled by a motor vehicle a distance ahead. It was found in practice that this was desirable in order to minimize ring down. Furthermore, the cable connecting the sled to the motor vehicle is preferably made up of transmission lines with capacitive elements within to prevent distortion, noise and unwanted attenuation of the various signals.

In FIG. 3, the Pulser 42 produces a 3 nanosecond transient signal which is fed to a typical ATR circuit 43, which prevents the signal from reflecting back and then through a hybrid 44 to the antenna 41. Signal received by the antenna 41 is passed to a gain control amplifier 45. The antenna 41 is constructed as shown in FIG. 2 and described above with reference thereto. Other parts of the system shown in FIG. 3 may correspond to similarly named parts of the system shown in FIG. 1. However, such correspondence is not necessary. An output of the gain controlled amplifier is sampled by sampler 48 and displayed in both the oscilloscope 50 and the helix recorder 49. The oscilloscope displays any reflections from a pipe or other device below ground as a sharp S-curve; however, the helix recorder (like a sonar) device records all the reflections and the characteristic signature this for various underground objects is recorded. Clock 51, programs the entire operation. Pulser blanking 46 provides blanking pulses to the amplifier 45 that eliminate the energy of pulser 42 and prevent it from fouling up the reading of return echoes. Sensitivity time control 47 programs the amplification in order to eliminate amplifying spurious signals while the antenna is transmitting.

In summation, the antenna radiates a signal with significant power over a range of wavelengths that propagate through most soils with acceptable attenuation. The wavelength is appropriate to getting good reflections from objects several feet in dimension, but poor reflections from objects several inches in dimension. A conductor several feet in length only will send a reflection; a non-conductor will have to be a foot or two in minimum dimensions to record an echo. Further, transmission of signals and reception of echoes must be with a special type of antenna which is placed and moved in close proximity to the ground. The current in the antenna and waves in the ground interact through their near fields, as opposed to their far fields, which characterizes conventional antennas, which couple only through their far field. Internal reflections within this antenna must decay at least 20 to 30 db in each 10 nanoseconds after the applied excitation ceases. In order to do this, the antenna is a collection of matched and terminated sections of two element transmission lines. Since different types of soils have different frequency transmission characteristics, the frequencies which propagate through the soil is provided by signal of approximately 30 to 10 nanoseconds duration which has a frequency bandwidth containing the propagating frequencies. The received echoes are recorded on a paper type sonar display in order to have a continuous record of what has been observed of the given geography. This display allows one to distinguish over modest-sized objects such as pipes from clutter, or extended objects such as a ledge.

It is preferred that the sled carrying the antenna of the present invention be dragged at high speeds over a given section of geography. Sonic types of tests on earth borings would also be taken at random points. With this information, the underground structure of the entire area may be graphically mapped. This has not been possible in the past with the limited tools available to the engineers desiring such information.

Most of the components required in the present invention are off-the-shelf items with the exception of the antenna and that is shown in detail in FIG. 2. However, the operation and selection of components should be governed by the following theoretical discussion.

It is commonplace to regard the ground as an electrical conductor, rather than as a means for propagation of UHF electromagnetic energy. Nevertheless, Maxwell's equations predict that above a certain frequency range, usually designed $\omega^*$, the ground behaves like a lossy dielectric. This prediction can be described either in terms of a conductivity $\sigma$ for the soil and a dielectric constant $k\epsilon_0$; or in terms of a complex dielectric constant $\epsilon = \epsilon' + j\epsilon''$ and a loss tangent $\tan \delta$ such that $$\tan \delta = \epsilon'' / \epsilon'$$

In terms of the conductivity model, the value of the critical frequency is given by $$\omega^* = \sigma / k\epsilon_0, \quad (1)$$

assuming the magnetic permeability to be that of free space. Moreover, the complex propagation factor $\gamma$ for an unbounded wave at frequency $\omega$ propagating through such a medium is given by $$\gamma = j\omega/c_0 \sqrt{k} \sqrt{1 - j\omega^*/\omega} \quad (2)$$

in which $c_0$ is the speed of light in vacuum. The real part of $\gamma$ represents the attenuation $\alpha$ suffered per unit length, and the imaginary part of $\gamma$ is the phase shift $\beta$ per unit length of travel. The derivative $d\beta/d\omega$ represents the group delay to a wave packet near $\omega$ traveling through the medium.

When $\omega >> \omega^*$, the exact relationship (2) reduces to $$\doteq j\frac{\omega}{c_0}\sqrt{k} + \frac{1}{2}\omega^*\sqrt{k} \quad (3)$$

This represents distortionless propagation with a speed and characteristic impedance $Z_k$ reduced a factor of $k$ below that of free space, with an additional attenuation $\alpha$ equal to $$\alpha = 1/2\ \omega^* \sqrt{k}/c_0 = 1/2\ \sigma \sqrt{\mu_0/k\epsilon_0} = 1/2\ \sigma Z_k \quad (4)$$

Figure 5:
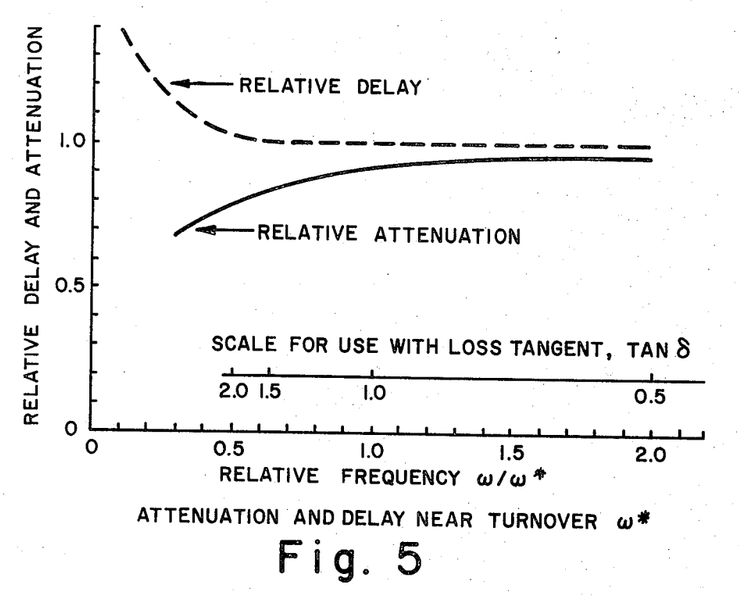
FIG. 5 is a graph showing the attenuation and delay of signals as functions of frequency.

The actual attenuation and delay as calculated from (2) are compared with the distortionless approximation in FIG. 5. At $\omega = \omega^*$, the attenuation is over 90 percent of that given by Eq. (4), and the delay distortion is negligible down to approximately one half of $\omega^*$.

The dielectric constant of ground, whether soil or rock, depends mostly on the moisture content, because the dielectric constant of water is so high ($k = 80$) compared to that of dry soil materials. The normal range for the dielectric constant of soil is from 10 to 20; the corresponding radar delays are from 15 to 30 ns per meter of radar range.

Measurements taken at broadcast frequencies suggest that for most soils, $\sigma$ lies in the range from $10^{-2}$ to $10^{-3}$ mho-m. The characteristic impedance $Z_k$ varies with moisture content, but for purposes of estimation, we can take it to be about 100 ohms. From these data, one can compute that $\omega^*$ lies in the range from 2 to 20 MHz, and that the attenuation will range from 1 to 10 db per meter of radar range.

Conductivity measurements related to broadcast frequencies can be only indicative of what occurs at higher frequency on account of the possible frequency dependence of $\sigma$. Water, for example, exhibits strong absorption at microwave frequencies, accompanied by a pronounced change in the dielectric constant. The "tail" of this absorption peak can affect soil loss measurements at frequencies as low as 200 MHz. In addition, certain chemically active clay minerals such as montmorillonite (bentonite) and illite have high absorption at UHF. In all cases, these excess losses are due to low energy molecular phenomena.

The possible frequency dependence of the conductivity is most conveniently dealt with in the laboratory by measuring the real part of the complex dielectric constant, $\epsilon'$, and the loss tangent, $\tan \delta$, as functions of frequency. Insofar as the theory is concerned, Equation (2) for the propagation remains unchanged except for the substitution of $\tan \delta$ for $\omega^*/\omega$ and $\epsilon'/\epsilon_0$ for $k$. Thus, when $\tan \delta$ is small we shall have the same approximations as before, with the attenuation given by $$\alpha \doteq \frac{\omega}{2c_0}\sqrt{\epsilon'/\epsilon_0}\ \tan \delta \quad (5)$$

As before, when $\tan \delta$ is near to unity, this computation of $\alpha$ is still nearly correct, the correction being given by FIG. 5 with $\tan \delta$ in place of $\omega^*/\omega$. Some measurements of $\epsilon'$ and $\tan \delta$ for several extremes of soil constitution and moisture content show the dielectric constant does not vary significantly between 1 and 1,000 MHz. It follows from FIG. 5, that for $\tan \delta$ less than 2, the group delay of a wave packet traveling through such soils will be independent of the frequency, even though the attenuation may vary considerably with frequency.

Figure 6:
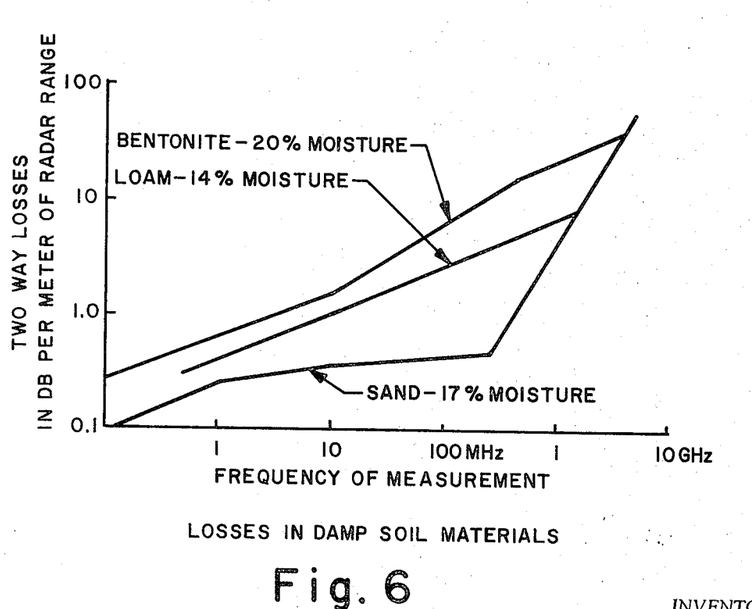
FIG. 6 is a graph showing losses as functions of frequency for different soil conditions.

Some of the data for wet soils is shown in FIG. 6. The sharply rising attenuation in sand beyond 200 MHz is assumed to be due to the water itself. The attenuation for the "soil" consisting almost wholly of the colloidally active mineral bentonite shows no "shelf" of the sort that would be predicted from Eq. (4) for a $\sigma$ which is independent of frequency. Natural soils with modest clay content tend to have curves with a shelf in the VHF frequency range, like the curve for wet sand in FIG. 6, although the attenuation is higher and the attenuation shelf may extend for less than a decade in frequency.

What conclusions can be reached from such measurements? It is clearly possible for a soil to display the enormous attenuation of sea water — a salt mud flat, for example. Barring such extremes, most soils exhibit a propagation delay that does not change significantly in the frequency range between 20 and 200 MHz, and attenuations less than 10 db per meter of radar range for frequencies below 100 MHz. Indeed, the conditions observed in the field have been less extreme than would be indicated by laboratory soil sample data. With pulse returns whose energy lies mainly in the band from 50 to 150 MHz, the attenuation has ranged from about 3 db to about 8 db per meter of radar range. The index of refraction or slowness of propagation with respect to free space has ranged from about 2.2 to about 5.0. Taken together, this field data is consistent with an attenuation of about 0.2 to 0.3 db of loss per nanosecond of radar delay. Calculations from laboratory measurements show a greater range for the loss per unit travel time through the soil. The narrow range of the observed losses may simply reflect the limited number of sites at which observations have been made.

In order to proceed with radar margin calculations it is necessary to assume a delay of 25 nsec/meter of radar range and a corresponding loss of 8 db/meter of radar range. These assumptions correspond to a fairly lossy soil with about 15 to 20 percent moisture.

With reference to antenna radiation — to a good first approximation, one can say that if the current distribution in the antenna is known, the underground field due to such an antenna just above the surface of the earth will be the same as if that antenna were entirely surrounded by the ground. The antenna is in fact in air, so that the current distribution is determined mainly by its electrical size in air. It was found possible to terminate the end of an antenna structure which behaves like a transmission line so as to annihilate the input transient when it propagates to the far end of the antenna. It was also found that for conductors whose width or diameter is measured up to a few inches, the propagation delays and characteristic impedance to pulses are nearly independent of the proximity of the ground, so long as the entire antenna structure is more than two inches above it.

The transmission line description of a terminated antenna structure is a good one. I have found it possible to locate internal reflections to within 1 to 2 inches in a structure measuring about 18 inches by 30 inches in overall size, using time domain reflectometry. I have also found it possible to reduce the maximum internal reflection to a 1 ns pulse below 10 percent of the incident pulse. If one uses an antenna of this sort, the voltage and current waveforms at any point along the antenna will be similar, the ratio being the characteristic impedance at that point, $Z_p$. Now, the power which is radiated by a given current distribution depends on the square of the current and an average radiation resistance determined by the media surrounding the antenna. The power propagated along the transmission line, however, varies directly as the characteristic impedance if the magnitude of the current is held constant. It follows that the efficiency of a terminated transmission line antenna varies inversely as its characteristic impedance, at least when the characteristic impedance is high compared with the radiation resistance. In the antennas which have been used with the present invention, the $Z_p$ has varied from 240 to 450 ohms, in a variety of structural configurations. In all cases, less than half of the energy in an incident 3 ns video pulse is radiated before that pulse is absorbed at the termination.

Experiments in which an inductively loaded transmission line structure slowed down the propagation by factors of 1.4 and 2.0, at the expense of correspondingly increased $Z_p$. Approximately half of the power in a 3 ns pulse reached the termination in the unloaded structure, two-thirds with a loading factor of 1.4 and four-fifths with a loading factor of 2.0. Thus one-half, one-third, and one-fifth of the incident energy is radiated, which is within experimental error of what would have been predicted from the variation of the characteristic impedance. Given the foregoing observations, the calculation of the radiative transient response of an antenna is straightforward.

If one focuses attention on the radiation directly down from the center of a horizontal flat antenna, then this will have the same form as if the antenna were in air. It immediately follows that if one wishes to radiated in this direction frequencies in the vicinity of some frequency $\omega$, when the total length of the antenna through Sections I, II, and III in air must be electrically one-half wavelength long in the vicinity of frequency $\omega$. This fact and the width of the two parallel element Section II fixes the size of the antenna. If it is desired to have substantial on-axis radiation near and below 100 MHz in order to assure propagation through clayey soils, then the antenna must have an overall electrical length of 1.5 m. (Its physical length can be somewhat shorter than its electrical length, owing to end loading phenomena.)

Inasmuch as a half wavelength in soil is shorter by a factor of three to five than the corresponding half wavelength in air, the required antenna is large enought to have an underground beam pattern which differs significantly at any single frequency from the donut shaped pattern of the antenna. In particular, because of the low velocity of propagation in the ground, frequencies well below $\omega$ can be radiated off-axis. A rule-of-thumb estimate is to say that each dipole-like piece of the antenna radiates into the usual pattern. When these individual pieces are combined, the overall radiation pattern seems to be about the same, with different frequencies of the input transient going into different parts of the pattern. There is also a directional-coupler effect, due to the transmission of a high velocity wave near the boundary of a lower velocity medium. In the case of a linear antenna which closes at the far end for the purpose of terminating the traveling wave, this exceptional effect tends to be a null in the net direction of propagation along the antenna, at an angle from the perpendicular whose sine is given by the ratio of the speed of propagation in the ground to the average speed of propagation along the antenna.

What happens when the antenna is raised above the surface of the ground is that one loses the low frequency radiation and the visibility that this radiation gives at large angles away from the vertical. Consider, for example, an antenna which has an on-axis radiation peak at 100 MHz and a radiation peak at 50 MHz 45° off-axis when it is close to the surface of ground which is a factor of five slower than free space. Further, let us suppose that the geometric slant range angle to a source is also 45°. Now, the optical ray path from source to antenna is not in this direction at all, because the angle of total internal reflection at the ground-air interface is only ¼ radian or 12° off the vertical. Thus, the ray path must go from the source to the earth's surface at some angle within 12° of the vertical, and thence nearly horizontally through the air to the antenna. There is little coupling from the antenna into energy coming from this direction at any frequency that propagates well through the soil. Hence, the source is nearly invisible along the optical ray path.

Now consider the direct goemetric path to the vicinity of the antenna. Although there is total internal reflection, the field is not zero just above the interface. Let us assume for simplicity that what arrives at the boundary is a plane wave of infinite extent, and that the attenuation of the soil is negligible. Let $\lambda s$ be the wavelength at $\omega$, measured along the boundary. The field above the boundary then falls off exponentially, as $$e^{-2\pi z/\lambda s}$$

in which $z$ is the vertical distance above the surface. Using the data assumed above, one finds in this example that $\lambda s$ is 1.7 meter, and that the visibility in this case would fall off about 1 db for each 3 cm the antenna is raised above the surface.

The actual antenna situation is more complicated than what has just been assumed, and in general these assumptions err to the conservative side. A suggested rule-of-thumb for real antennas is that the beneficial effects of near field coupling fall off 6 to 10 db (two way loss) when the antenna is raised one half of its smallest dimension above the ground, and precipitously thereafter.

It is easiest to determine what happens when an electromagnetic wave travels in an otherwise homogeneous medium when every dimension of the object is small compared to a wavelength. In this case, if the object is non-metallic there is some small amount of backscatter proportional to a high power, such as the fourth power, of the smallest linear dimension of the object. (If the object is metallic, the longest linear dimension is a better guide to its behavior.) when the scale of the surface of the irregularity is gross compared to a wavelength at the frequency being considered, then the problem is also simple, for one can treat the irregularity as a geometric boundary or as an optical reflector. When the minimum circumference of an irregularity lies between one-half and three wavelengths, the discussion is potentially quite complicated, owing to diffraction phenomena. This latter situation is encountered with objects that should be observable with an earth-penetrating radar. In those special cases which have been the subject of computer evaluation, the lossiness of soil as a medium of propagation apparently simplifies the backscatter problem.

For the purpose of estimating performance margins, we shall use the simplicity of these results to justify the assumption that the backscatter from an object is directly proportional to its area projected in the direction of propagation even if the minimum circumference is of the order of a wavelength or less. What is clear, however, is that objects whose minimum dimensions are small, such as tree roots, are for all practical purposes invisible. The smallest single object that has been individually detected with an earth penetrating radar in the 100 mc region was a rock loaf about ½ m on a side, buried 1 ½ m deep in a sandbank for which the wavelength was about 1 m.

To construct a chart for the potential performance margins for a radar, it is necessary to decide upon the frequency range in which it is to be operated. With the present invention, the following considerations favor operation at high frequency:

1. The need to have sufficient bandwidth to resolve the five or ten nanoseconds of delay which correspond to one foot of distance through the ground.
2. The desire to have a small antenna in the air.
3. The need to operate above $\omega^*$ so that initially compact wave packets will not become dispersed.
4. The desire to keep the objects to be observed large in terms of electrical wavelengths, so that they will efficiently reflect signals.

Two factors operate against high frequencies in favor of lower ones:

1. Small antenna size means correspondingly low signal gathering power as a receiving aperture.
2. In clayey soils attenuation tends to rise sharply above 100 MHz.

The last consideration is the crucial one, because it radically affects potential range.

Because of the wide range of soil propagation conditions, no single narrowband frequency range was chosen for this invention. Instead, the antenna was chosen to have about ½ m² of effective area. This antenna was so constructed that the transient response between two of them, directly facing each other, is approximately three half cycles of an 80 MHz sine wave, the outer half cycles having one-third to one-half the amplitude of the central one. The bulk of the power radiated from this antenna lies between 30 and 120 MHz when it is placed over soils in which the speed of propagation is about one-fourth that of free space. The center of gravity of the radiated power spectrum shifts upwards if the speed of propagation in the soil is higher.

Of the three factors that enter into an estimate of system performance; namely, the antenna, the soil propagation, and the effective reflection from the target, only the propagation of the far field through homogeneous soil is easily calculated. What was done to replace otherwise difficult calculation was to apply a 3 to 5 nanosecond pulse to a known antenna and to observe the reflection from a wooden coffin placed 1 meter beneath it in soil of known attenuation properties. The peak-to-peak return signal was then found to be about 35 db below the peak of the pulse delivered to the antenna system by the transmitter. The magnitude of this return has scaled linearly as the width of the long underground box was varied from 18 inches to 30 inches.

What we shall do here is to use this 35 db as the round trip loss to a void 0.7 meter wide buried 1 meter deep in a typical soil. We shall then introduce other system losses, gains and limitations. What is left over is the margin available with which to see deeper objects. One way of presenting the results is in the form of a delay-loss curve such as that of FIG. 4. This curve describes the sum of the attenuations encountered by a reflection which reaches the receiver a given time after the initial pulsing of the antenna on the assumption of 8 db and 25 ns of attenuation and delay per meter of radar range, together with basically one-dimensional scattering from the long underground void.

Figure 4:
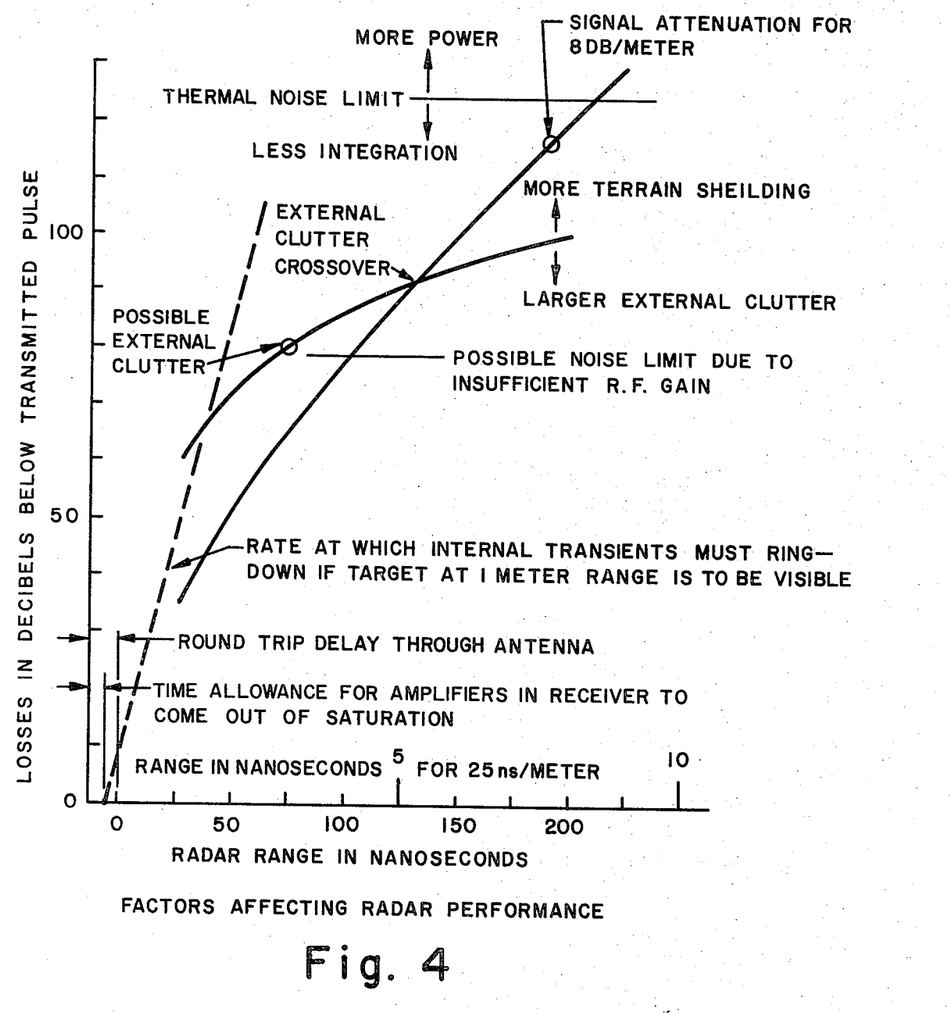
FIG. 4 is a graph showing the design criteria for such a system as functions of losses and time range.

FIG. 4 displays several factors which must enter practical radar design. In addition to the attenuation of signal with radar delay, the figure shows by another solid line the attenuation suffered by clutter external to the ground. The underground reflection starts out with an advantage because for a given time delay it is much closer. Also, since the antenna is to be operated close to the ground, it is shielded from such external clutter by the surrounding terrain and by its proximity to the air-ground interface. Nevertheless, the excess attenuation in the ground must eventually overcome these advantages so that for some sufficiently great radar range surface clutter should dominate underground reflections. The actual crossover point is well to the right of that shown in the diagram.

FIG. 4 also shows various allowances which must be made for the ring down of internal transients within the radar itself. The time axis shows the allowances for the round trip travel time of the radar pulse through the antenna, and an allowance of time following the end of the transmit pulse during which the receiver amplifiers recover from saturation. Following the recovery to linearity, the internal system transients must ring down at a rate of about 2 db per nanosecond, as shown by the dashed line, in order that a target a 1 meter depth be visible above this internal clutter.

Finally, FIG. 4 shows what has turned out in practice to be the least important of the performance problems in constructing an earth-penetrating radar, the fundamental performance limitations due to internal amplifier noise. This noise may originate as thermal noise in the front end of the receiver, as indicated by the horizontal line in the upper right hand corner of the FIG.; or it may be due to noise in the sampling devices necessary for displaying the returns, as shown by the horizontal line towards the middle of the Figure. The thermal noise limit can always be reached, in principle at least, by using sufficient wide-band gain ahead of the sampling display, but the possibility of doing so in practice is limited by the problem of providing sufficient dynamic range and/or dynamic gain control to keep the returns within the dynamic range of the display.

The actual level at which amplifier noise limits the observability of signals depends on the amounts of pulse-to-pulse integration that can be employed. The repetitive sampling method of displaying fast waveforms is quite wasteful of pulses, one pulse return being required for each of several hundred points in the final display trace. On the other hand, with the short maximum ranges involved, the pulse repetition rate of the radar is limited only by the speed with which the sampling circuitry can do its work. With such displays, some pulse-to-pulse integration is generally available by sweeping through the waveform display at a much slower rate than the maximum theoretically possible. Additional pulse-to-pulse integration is also available through sweep-to-sweep integration in the eye of the observer. It is important to note that alone of the three factors considered in FIG. 4, random receiver noise is the only limitation which yields to increased transmitter power.

Note: the total sweep range is 1,000 ns at 1 MHz rep. rate, which is divided into 300 resolution cells by the 3 ns transmit pulse. At the 100 kc sampling rate of a 1S1 head, with 30 sweeps per sec., there are 3,000 samples per sweep, which is 10 samples which can be integrated per resolution cell. Since 300 MHz rather than 3,000 MHz is the bandwidth required for this invention, it is assumed that in a potential system, the sampling rate could be raised to 1,000 kc, at which point there would be 100 samples per resolution cell, or 20 db or integratable gain over a single pulse.

The margins for additional range must encompass both the normal free space radar losses and the excess propagation losses due to the conductivity of the soil. Conventionally, the free space radar loss scales as the inverse fourth power of range. However, with the sizes and separations of antennas and tunnels considered here, the present invention "sees" more of the tunnel the further away it gets, so that the inverse cube of distance is a more realistic estimate of this loss. The excess loss has been assumed to be directly proportional to range. The resulting third or fourth degree equation can be solved by trial-and-error and interpolation for the ranges which just use up the available margins.

One observes that what one buys for 35 db of extra system performance is two or three meters in additional range, and that even in quite lossy soils one seems to be guaranteed about 4 meters of depth of detection.

Figure 7:
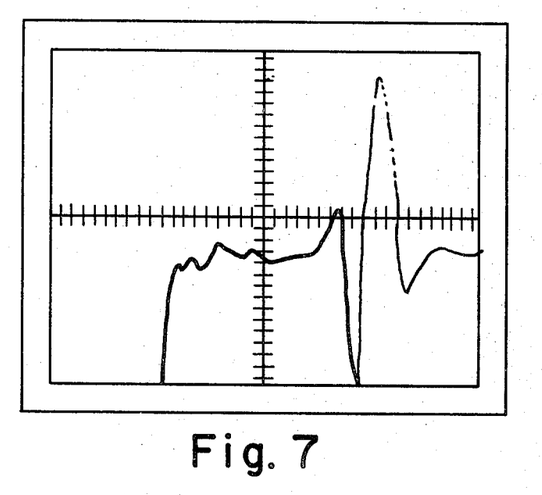
FIG. 7 is an oscilloscope trace of a return signal from an underground pipe.
Figure 8:
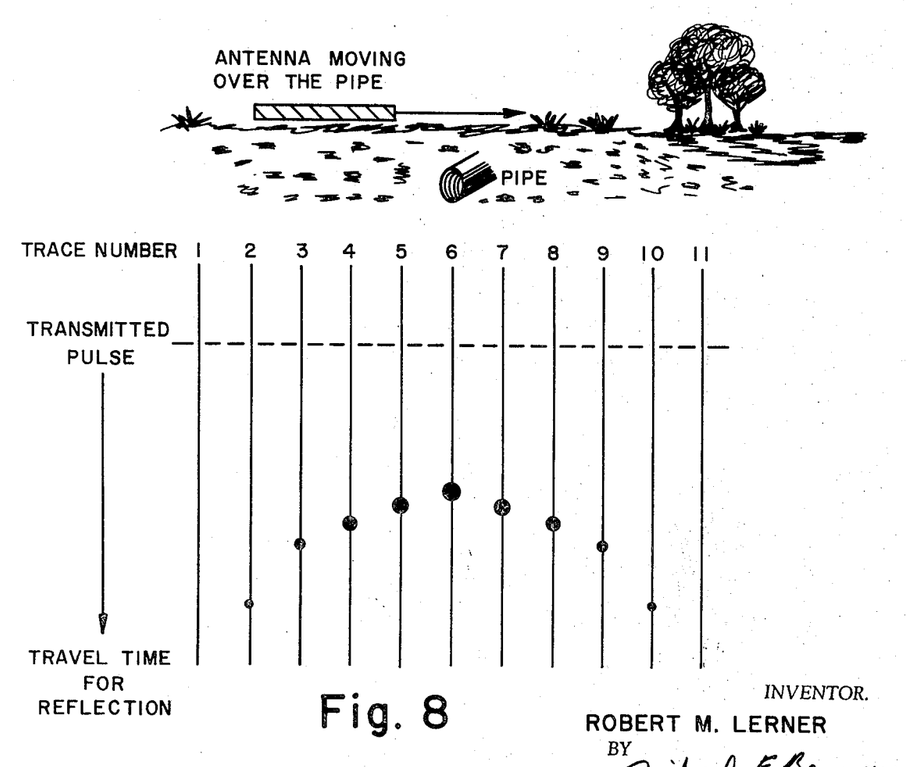
FIG. 8 shows a signature of an underground pipe.

FIG. 7 shows an "S"-shape response of a 5 ½ foot tunnel, 50 millivolts per division and 10 nanoseconds per division on the oscilloscope. FIG. 8 shows the recordation of a tunnel on the helix recorder, being keyed to the locus of the antenna.

The present invention has been shown with reference to specific apparatus and those skilled in the art may make many substitutions and variations in the present invention without departing from the true scope and spirit of the present invention, therefore, I wish to be limited only by the appended claims.

What is claimed:

1. In a ground radar system the method of determining the character of underground discontinuities, comprising the steps of:
   generating a transient signal,
   conducting said signal through a finite segment of a two-parallel-element transmission line antenna, the elements of which lay in a plane parallel to the ground plane,
   passing the transmission line antenna over the ground in proximity to the ground,
   receiving reflected signals from discontinuities beneath the earth, and
   displaying said signals representative of underground discontinuities.

2. In a ground radar system the method of determining the character of underground discontinuities according to claim 1, which further includes recordation of said return signals on a sonar-type recorder.

3. In a ground radar system the method of determining the character of underground discontinuities according to claim 1 wherein said passing of the radiating segments of said transmission line over the ground includes dragging a sled containing said matched segments in a plane parallel to the ground, which plane is within a range of from 2 to 12 inches above the earth.

4. A ground radar system for determining the character of underground discontinuities, comprising:
   means for generating a transient signal,
   means for conducting said signal through a finite segment of a two-parallel-element transmission line antenna, the elements of which lay in a plane parallel to the ground plane,
   means for passing the transmission lines over the ground in proximity to the ground,
   means for receiving reflected signals from discontinuities beneath the earth, and
   means for displaying said signals representative of underground discontinuities.

5. A ground radar system as in claim 4 wherein said means for conducting said signal to said two-parallel-element transmission line segment comprises a two-element tapered transmission line segment connected between said signal generating means and said two-parallel-element transmission line segment.

6. A ground radar system as in claim 5 wherein said means for conducting said signal comprises a two-element tapered transmission line segment connected between the other end of said parallel segment and a non-reflective load.

7. A ground radar system as in claim 6 wherein, the total electrical length of said parallel segment and said tapered segments is within an order of magnitude of a one-half wavelength of the center frequency of said signal.

8. A ground radar system for determining the character of underground discontinuities according to claim 4, wherein said means for passing of the transmission line over the ground includes means for dragging a sled containing said transmission line in a plane parallel to the ground, which plane is within a range of from 2 to 12 inches above the earth.

* * * * *

UNITED STATES PATENT OFFICE
CERTIFICATE OF CORRECTION

Patent No. 3,831,173     Dated August 20, 1974

Inventor(s) Robert M. Lerner

It is certified that error appears in the above-identified patent and that said Letters Patent are hereby corrected as shown below:

Insert as the second paragraph in the section entitled "Abstract":

--The invention herein described was made in the course of work performed under a contract with the Department of the Air Force, Electronic Systems Division.--

Signed and sealed this 22nd day of October 1974.

(SEAL)
Attest:

McCOY M. GIBSON JR.
Attesting Officer

C. MARSHALL DANN
Commissioner of Patents